O. BONNEY, Jr.
Harvester.
No. 80,124.
Patented July 21, 1868.
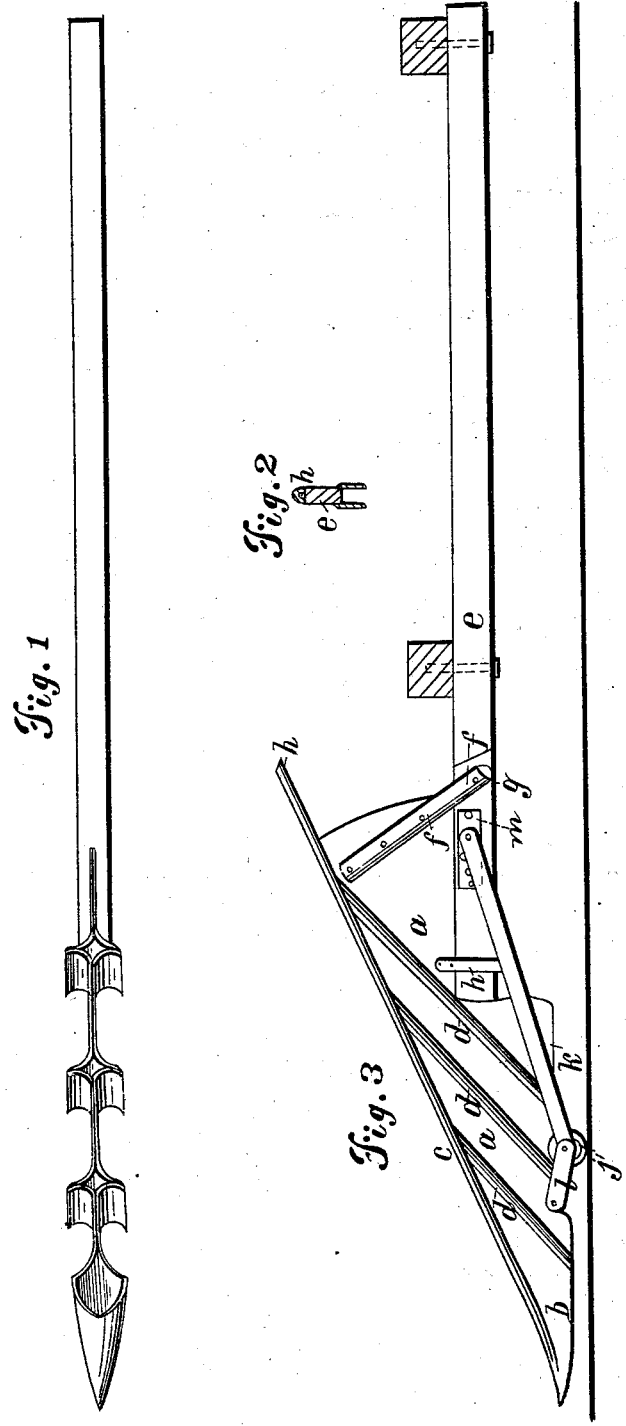
Witnesses:
T. Smith
L. E. Jones.
Inventor.
Olpha Bonney Jr.
by Atty. Thos. F. Everett

UNITED STATES PATENT OFFICE.

OLPHA BONNEY, JR., OF SAN FRANCISCO, CALIFORNIA.

IMPROVEMENT IN HARVESTERS.

Specification forming part of Letters Patent No. 80,124, dated July 21, 1868.

*To all whom it may concern:*

Be it known that I, OLPHA BONNEY, Jr., of San Francisco, in the State of California, have invented a certain new and Improved Harvest-Helper; and I do hereby declare that the following is a full, clear, and exact description of the same, reference being had to the accompanying drawings, and to the letters and marks thereon, which said drawings form part of this specification, and show a helper constructed under my invention—

Figure 1 being a side view of such helper; Fig. 2 being a view, by transverse section, of the header-beam and spring; and Fig. 3 being a view of a modification.

In each of these figures, where like parts are shown, like marks and letters are used to indicate the parts.

In many sections of the country where wheat is grown to a great extent heavy rains and winds force it down on or toward the ground to so great a degree that the grain cannot be cut by either a header or a low-cutting reaper. Efforts have been made to relieve the grain from this prostrate condition by using grain-lifters. These are usually constructed of springs, and have not been found efficient. The grain, when down, forms quite a strong net-work, and the springs become entangled therein, and are frequently broken. Now, my invention has for its object elevating the grain-stalks, and putting them in a good position for the knives of the header or harvester. This helper is somewhat of a triangular form, composed in part of wood $a$ and part of metal. A metal strip, $b$, shows the lower front part, while another strip, $c$, covers the upper surface. Other strips or ribs, $d$, are attached to the sides.

The header-beam $e$ is pivoted to the bar $f$ at $g$, and its front end plays within the yoke $h$. Between the curve or bend of the yoke and the edge of the beam is a rubber spring, $i$, in a recess, and which, being thus sheltered, will not be interfered with by net-work of the grain-stalks.

A wheel, $j$, is pivoted at the end of the bar $k$ and the sides of the box $l$. The bar $k$, at its upper end, is adjustable in the plate $m$. By these means the helper can be run on a line parallel with the ground, or can be elevated from six to ten degrees. From four to eight of these helpers may be used with the header, the relation of them with the knives of the header being indicated by Fig. 1 of the drawings, where the dotted lines $n$ indicate the knives.

In use, the grain-stalks will be raised by the upper edge $c$ and by the strips or ribs $d$, as the stalks come in contact with these surfaces on the forward movement of the machine, and the stalks or uncut grain in the field will thus be so placed before the cutters of the header or harvester as to be fully and completely acted upon.

The modification shown by Fig. 3 is that of a helper constructed, with the exception of the supporting-beam, wholly of metal corrugated sides and ribbed top, the rim of this being by section.

What I claim as my invention, and desire to secure by Letters Patent, is—

1. A helper of substantially a triangular form, having the upper inclined edge $c$ and ribs $d$, for elevating the grain or stalks, as herein recited.

2. The wheel $j$, adjustable bar $k$, and box $l$, for the purpose set forth.

This specification signed this 6th day of April, A. D. 1868.

OLPHA BONNEY, JR.

Witnesses:
 THEO. STORM,
 GEO. C. WALLER.